(12) United States Patent
Haynes et al.

(10) Patent No.: US 9,581,271 B2
(45) Date of Patent: Feb. 28, 2017

(54) SEALING GLAND

(71) Applicant: Lake Products Limited, Rosedale, Auckland (NZ)

(72) Inventors: Andrew Leo Haynes, Auckland (NZ); Gabriel Ioan Giurgiu, Auckland (NZ)

(73) Assignee: Lake Products Limited, Auckland (NZ)

( * ) Notice: Subject to any disclaimer, the term of this patent is extended or adjusted under 35 U.S.C. 154(b) by 0 days.

(21) Appl. No.: 14/466,371

(22) Filed: Aug. 22, 2014

(65) Prior Publication Data

US 2015/0054229 A1 Feb. 26, 2015

(30) Foreign Application Priority Data

Aug. 23, 2013 (NZ) .................................. 614676

(51) Int. Cl.
*F16L 5/08* (2006.01)
*F16L 5/10* (2006.01)
*F16L 5/14* (2006.01)

(52) U.S. Cl.
CPC .. *F16L 5/10* (2013.01); *F16L 5/14* (2013.01)

(58) Field of Classification Search
CPC ....... F16L 5/00; F16L 5/02; F16L 5/10; F16L 5/14
See application file for complete search history.

(56) References Cited

U.S. PATENT DOCUMENTS

| | | |
|---|---|---|
| 2,510,362 A | 6/1950 | Anderson |
| D170,425 S | 9/1953 | Monahan, Jr. |
| 3,205,760 A | 9/1965 | Seckerson et al. |
| D216,693 S | 3/1970 | Dammer |
| 3,566,738 A | 3/1971 | Cupit |
| 3,602,530 A | 8/1971 | Elwart |
| 3,654,965 A * | 4/1972 | Gramain ............... F16L 21/002 138/89 |
| 3,893,919 A | 7/1975 | Flegel et al. |
| 3,977,137 A | 8/1976 | Patry |
| 4,120,129 A | 10/1978 | Nagler et al. |
| D252,703 S | 8/1979 | Cupit |
| 4,211,423 A | 7/1980 | Resech |
| 4,333,660 A | 6/1982 | Cupit |
| D269,454 S | 6/1983 | Houseman |
| 4,449,554 A | 5/1984 | Busse |
| 4,469,467 A | 9/1984 | Odill et al. |

(Continued)

FOREIGN PATENT DOCUMENTS

| | | |
|---|---|---|
| AU | 199895218 | 6/1999 |
| AU | 200042690 | 1/2001 |

(Continued)

*Primary Examiner* — Gilbert Lee (74) *Attorney, Agent, or Firm* — Foley & Lardner LLP (57) ABSTRACT

A sealing gland is provided for forming a seal between a plurality of elongate members and a surface having an aperture, or a pipe, through which the elongate members extend. The sealing gland includes a main sealing portion for sealing to the surface or the pipe. Skirts extend from a base of the sealing gland, where each skirt includes a lumen extending from the base to a distant end of the skirt for receiving one of the elongate members. Each skirt provides a flexible seal for sealing around a periphery of the elongate member, and adjacent skirts are adjoined along a portion of the length of the skirts.

25 Claims, 7 Drawing Sheets

(56) References Cited

U.S. PATENT DOCUMENTS

| | | |
|---|---|---|
| 4,519,793 A | 5/1985 | Galindo |
| 4,570,943 A | 2/1986 | Houseman et al. |
| 4,625,469 A | 12/1986 | Gentry et al. |
| 4,664,390 A | 5/1987 | Houseman |
| D292,233 S | 10/1987 | Schalle |
| D292,234 S | 10/1987 | Schalle |
| D294,177 S | 2/1988 | Sherlock |
| 4,903,997 A | 2/1990 | Kifer |
| D312,506 S | 11/1990 | Schalle |
| 5,010,700 A | 4/1991 | Blair |
| 5,018,748 A | 5/1991 | Schalle |
| 5,036,636 A | 8/1991 | Hasty |
| 5,176,408 A | 1/1993 | Pedersen |
| 5,222,334 A | 6/1993 | Hasty |
| 5,226,263 A | 7/1993 | Merrin et al. |
| 5,347,776 A | 9/1994 | Skoff |
| 5,414,964 A | 5/1995 | Bodycomb |
| D364,933 S | 12/1995 | Schalle |
| D370,274 S | 5/1996 | Menzies |
| 5,588,267 A | 12/1996 | Rodriguez et al. |
| D380,039 S | 6/1997 | Sutherland et al. |
| 5,703,154 A | 12/1997 | Davis et al. |
| 5,711,536 A | 1/1998 | Meyers |
| D423,087 S | 4/2000 | Houseman |
| 6,123,339 A | 9/2000 | Otsuji et al. |
| D436,157 S | 1/2001 | Houseman |
| 6,185,885 B1 | 2/2001 | Thaler |
| D447,222 S | 8/2001 | Mathers |
| 6,409,178 B1 | 6/2002 | Raden et al. |
| 6,471,217 B1 * | 10/2002 | Hayfield ............... F16L 39/02 277/602 |
| 6,752,176 B1 | 6/2004 | Price et al. |
| 6,830,269 B1 | 12/2004 | Mayle |
| 6,866,271 B2 | 3/2005 | MacDonald |
| 6,957,817 B2 * | 10/2005 | Goll ..................... F16L 5/08 277/602 |
| 7,021,878 B1 | 4/2006 | Albertson et al. |
| D525,685 S | 7/2006 | Walton |
| 7,140,618 B2 | 11/2006 | Valls, Jr. |
| D581,777 S | 12/2008 | Huang |
| D585,968 S | 2/2009 | Elkins et al. |
| D593,641 S | 6/2009 | Plank et al. |
| 7,814,709 B1 | 10/2010 | Resech |
| 8,141,303 B2 | 3/2012 | McDow et al. |
| 8,209,923 B1 | 7/2012 | Rich |
| 8,608,206 B2 | 12/2013 | Fedale et al. |
| 8,614,400 B2 * | 12/2013 | Aldrich ............... H02G 3/083 174/650 |
| 8,656,667 B2 | 2/2014 | Beall |
| D722,621 S | 2/2015 | Gray et al. |
| 2004/0255523 A1 | 12/2004 | Bibaud et al. |
| 2004/0262854 A1 | 12/2004 | Matczak et al. |
| 2005/0055889 A1 | 3/2005 | Thaler |
| 2006/0145428 A1 | 7/2006 | Dudman |
| 2006/0186607 A1 | 8/2006 | Shih et al. |
| 2007/0101664 A1 | 5/2007 | Hoy et al. |
| 2007/0143956 A1 * | 6/2007 | Kumakura ............ F16L 5/10 16/2.2 |
| 2008/0092844 A1 * | 4/2008 | Tsukamoto ........... F16L 5/10 123/195 C |
| 2009/0302545 A1 | 12/2009 | Haynes |
| 2010/0059941 A1 * | 3/2010 | Beele .................... F16L 5/10 277/606 |
| 2011/0140371 A1 | 6/2011 | Strydom |
| 2011/0156354 A1 * | 6/2011 | Egritepe .............. F16L 5/08 277/314 |
| 2011/0266755 A1 | 11/2011 | Anderson et al. |
| 2012/0126529 A1 | 5/2012 | Beall |
| 2012/0297573 A1 * | 11/2012 | Iwahara ............... F16L 5/10 16/2.2 |
| 2013/0193652 A1 | 8/2013 | Whitley |
| 2014/0084549 A1 * | 3/2014 | Haynes ................ F16L 5/10 277/606 |

FOREIGN PATENT DOCUMENTS

| | | |
|---|---|---|
| AU | 199911298 | 2/2002 |
| CA | 2104172 | 3/1994 |
| DE | 296 13 258 | 9/1996 |
| DE | 200 15 281 | 1/2001 |
| DE | 103 58 668 | 3/2005 |
| FR | 2862736 | 5/2005 |
| WO | WO-88/09855 | 12/1988 |
| WO | WO-98/09855 | 3/1998 |
| WO | WO-2006/128790 | 12/2006 |

* cited by examiner

SEALING GLAND

CROSS-REFERENCE TO RELATED APPLICATIONS

This Application claims the benefit of priority to New Zealand patent application No. 614676, having a filing date of Aug. 23, 2013, the complete disclosure of which is hereby incorporated by reference for all purposes.

FIELD OF THE INVENTION

The present invention relates to sealing glands and in particular though not solely to sealing glands for sealing between and about an elongate member, for example a pipe or cable, and a surface, for example a wall, ceiling or floor, or a wall or side of a box or enclosure such as a housing for containing electrical and/or other components.

BACKGROUND TO THE INVENTION

Specific requirements for clean areas for example in food handling, biologically sensitive areas, or other such areas requiring a clean seal, requires use of a seal that can be cleaned easily, applied easily and become functional easily yet is also consistent in its sealing engagement to both the pipe and the wall, and that is manufactured from inert and chemically resistant materials, so as to not contaminate the immediate environment, and to withstand cleaning and the like.

The same criteria apply when sealing a pipe to a further pipe that it may pass through. The further pipe may be an outer sleeve such as a kick pipe to prevent damage to the inner pipe. Such assemblies are often present where a pipe passes through a wall, floor or ceiling and the wall floor or ceiling has an outer sleeve for the pipe to pass through.

Specific requirements for ingress protection, for example in hazardous environments, also require the use of a seal between a pipe or cable and a wall of an enclosure.

There are numerous ways of sealing a cavity about pipes and similar elongate members to a flat surface which they may pass through. The most simple method for sealing between a wall and a pipe or other elongate member passing through the wall is the application of sealant about the periphery of the pipe adjacent the region of the wall into or through which the pipe may pass through. Prior art methods that use sealants and similar are messy and time consuming and the sealant cannot be easily removed and replaced, meaning that the pipe, wall panel or similar cannot be easily removed and replaced. Further, the use of sealant can provide a surface or joint between the pipe and wall that provides a collection or accumulation area for dirt or grime that can be difficult to clean, causing hygiene concerns or issues.

Another example of these is the use of a stainless steel flange attached to the elongate pipe or member. This is then attached to the flat surface in a first method by standing this off the flat surface and then sealing the space with sealant. This is not an easily removable system. The second is the bolting of the flange to a further wall fitting and locating between the two a sealing component, e.g. an "O" ring. This method and the previous one do not stand up well to vibration and flexure of the pipe relative to the flat surface. This method, like the previous sealing method using sealant, can also provide crevices or collection/accumulation points that are difficult to clean.

Further methods utilize boots and similar to engage both the pipe and wall. Different sized boots are typically provided depending on the size or diameter of the elongate member that is to pass through and be sealed to a wall or other surface. Cone or stepped boots exist, that may be cut at a suitable height to fit a particular sized pipe or conduit or cable.

Increasingly hygienic environments, for example food handling and preparation premises, require high standard chemically inert materials to be present. This is not only to preserve the hygienic environment but also the method of cleaning such places uses highly corrosive clean in place chemicals that attack most materials such as rubbers and steels, including 305 stainless steel. These chemicals or environments are also often thermally elevated increasing their reactivity. Such environments require materials that are compatible with such harsh environments.

Additionally such environments require a vibration and flexure resistant sealing and often a fire retardant and resistance seal. Such relative movement can occur due to impact of the pipe or surface, flow in the elongate member, water or gas hammer or thermal expansion. The relative movement can be both radially and axially of the elongate member.

Further, in hazardous environments where protection of sensitive equipment is necessary, or where separation of equipment from hazardous environments is required to remove the risk of fire or other catastrophic events, seals or glands for providing suitable ingress protection to enclosures are required that provide flexibility in installation and that allow for future upgrades and/or configuration of the number of pipes or cables extending into a sealed/controlled enclosure.

To date no such gland exists that offers all these properties and there is a long felt want in the industry that as yet has not been addressed.

It is therefore an object of the present invention to provide a sealing gland to overcome the one or more of the above problems or at least to provide the public with a choice.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

In one aspect, the present invention consists in a sealing gland for forming a seal between a plurality of elongate members and a surface having an aperture, or a pipe, through which said elongate members extend, said sealing gland comprising:

a main sealing portion for sealing to the surface or the pipe, a plurality of skirts extending from a base of the sealing gland, each skirt comprising a lumen extending from the base to a distal end of the skirt for receiving a said elongate member, each skirt providing a flexible seal for sealing around a periphery of a said elongate member, and adjacent skirts in the plurality of skirts adjoined along a portion of the length of the skirts.

Preferably, the adjacent skirts are adjoined along approximately half the length of the skirts, from the base to approximately midway along the length of the skirts.

Preferably, at least one said skirt comprises a closed end, the skirt comprising the closed end adapted to be cut to provide an aperture for a said elongate member to extend through.

Preferably, each said skirt comprises a closed end.

Preferably, the skirts comprise a stepped side wall.

Preferably, the skirts comprise a stepped external surface and a stepped internal surface.

Preferably, internal steps of the stepped internal surface are positioned closer to a distal end of the skirt than external steps of the external surface.

Preferably, the internal surface of the skirt between each internal step provides a sealing surface for sealing about a said elongate member.

Preferably, each said sealing surface is tapered narrowing from a first diameter to a second diameter towards a distal end of the skirt.

Preferably, the wall of each skirt comprises at least one step formed in the portion of the length of the skirt adjoined with an adjacent skirt.

Preferably, each skirt comprises at least one step in the wall between the distal end of the skirt and the portion of the length of the skirt adjoined to an adjacent skirt.

Preferably, adjacent skirts in the plurality of skirts are adjoined along a portion of the length of the skirts extending from the base to a step in the external surface of the wall of the skirt.

Preferably, an internal diameter of a said skirt at an extent of a join between the walls of two adjacent adjoined said skirts is a maximum aperture size of that skirt.

Preferably, an internal surface of the skirt extending from the maximum aperture towards the base is a sealing surface for sealing about a said elongate member.

Preferably, each skirt is adjoined to two adjacent skirts.

Preferably, the base comprises a thickness greater than a thickness of the wall of the skirt.

Preferably, the thickness of a portion of the base that is encircled by the skirts is greater than the thickness of a portion of the base outside the plurality of skirts.

Preferably, the thickness of a portion of the base that is encircled by the skirts is at least twice the thickness of a portion of the base outside the plurality of skirts.

Preferably, the thickness of a portion of the base that is encircled by the skirts is two to three times the thickness of a portion of the base outside the plurality of skirts.

Preferably, the sealing gland comprises four skirts.

Preferably, the main sealing portion of the sealing gland comprises a flange for sealing to the surface, the flange projecting radially outwards from an open end of the sealing gland.

Preferably, the sealing gland comprises a retaining lip for retaining a compression ring in place against the flange.

Preferably, the flange is coplanar with the base.

Preferably, the flange is provided at an open end of the sealing gland spaced from the base in a longitudinal direction, the sealing gland comprising an internal cavity between the base and the flange.

Preferably, the main sealing portion of the gland comprises a tubular section extending from the base for sealing to an end of a pipe from which the elongate members extend.

Preferably, the main sealing portion of the sealing gland comprises an annular groove formed between a retaining lip and an annular shoulder, the annular groove for receiving a perimeter of the aperture in the surface of a wall, in use the groove retaining the wall between the retaining lip and the shoulder to form a seal with the surface.

Preferably, the sealing gland comprises an internal cavity between the base and an open end of the sealing gland, the lumen of each skirt extending from a distal end of each skirt and the internal cavity.

Preferably, the lumen of each skirt extends the full length of the sealing gland from the distal end of the skirt to an open end of the sealing gland.

Preferably, the sealing gland is a unitary member.

Preferably, the gland is formed or moulded from silicone.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

Embodiments of the present invention are described with reference to FIGS. 1 to 7.

The sealing gland 1 consists of a plurality of skirts 5. The illustrated embodiments comprise four skirts 5. However, in some embodiments, the sealing gland may comprise two or three or four or more skirts 5. In use each skirt seals about a corresponding elongate member such as a cable or pipe. A main seal or main sealing portion of the sealing gland opposite the skirts is adapted to seal to or against a surface or pipe, as described below. Thus the sealing gland is adapted to seal between a plurality of elongate members and a surface (planar or otherwise) or around an open end of a pipe.

In some embodiments each skirt 5 is tapered. In some embodiments each skirt may be substantially frustoconical in shape. In some embodiments each skirt may be pyramid-shaped, with multiple sides from three upwards. In some embodiments each skirt may be substantially cylindrical in shape; however such an embodiment may be less preferred. The size of each skirt 5 will depend on the size of the elongate member the skirt is to seal about or around.

Each skirt may comprise markings, for example marked rings, at different positions along the length of the skirt, which indicate at which point a user should cut the skirt to create an aperture suitable for a particular size of elongate member. The marking may additionally include indicia to indicate a particular diameter or size which may occur when cutting at that mark. It should be noted that although in the preferred embodiment these markings are perpendicular to the longitudinal centre line, or centre of rotation, of the skirt 5, these could be angled to create oval apertures for pipes of oval cross-section, or if an angled construction, with the elongate member angled away from perpendicular with a surface, is required.

It should also be noted that one or more skirts 5 may be pre-cut or open to a required size of a particular elongate member. The tapered skirt, truncated cone, pyramid or frustoconical skirt 5 thus created comprises an outer aperture 20 which defines an outer periphery for sealing against or around the circumference of an elongate member.

As described above, the skirt 5 may comprise at its outer portion or periphery an opening 20 which may be provided by the pre-cut sealing gland 1 or when cut from the gland in use. Preferably one or more skirts 5 are provided with a closed outer end. The closed end may provide an outer surface 6 for providing an outer seal 6 to seal about an elongate member to pass through the surface. In a preferred embodiment, each skirt is provided with a closed end 6. In use, the sealing gland may be used to seal about a number of elongate members less than the total number of skirts provided by the gland. Unused skirts remain closed.

Figure 3:
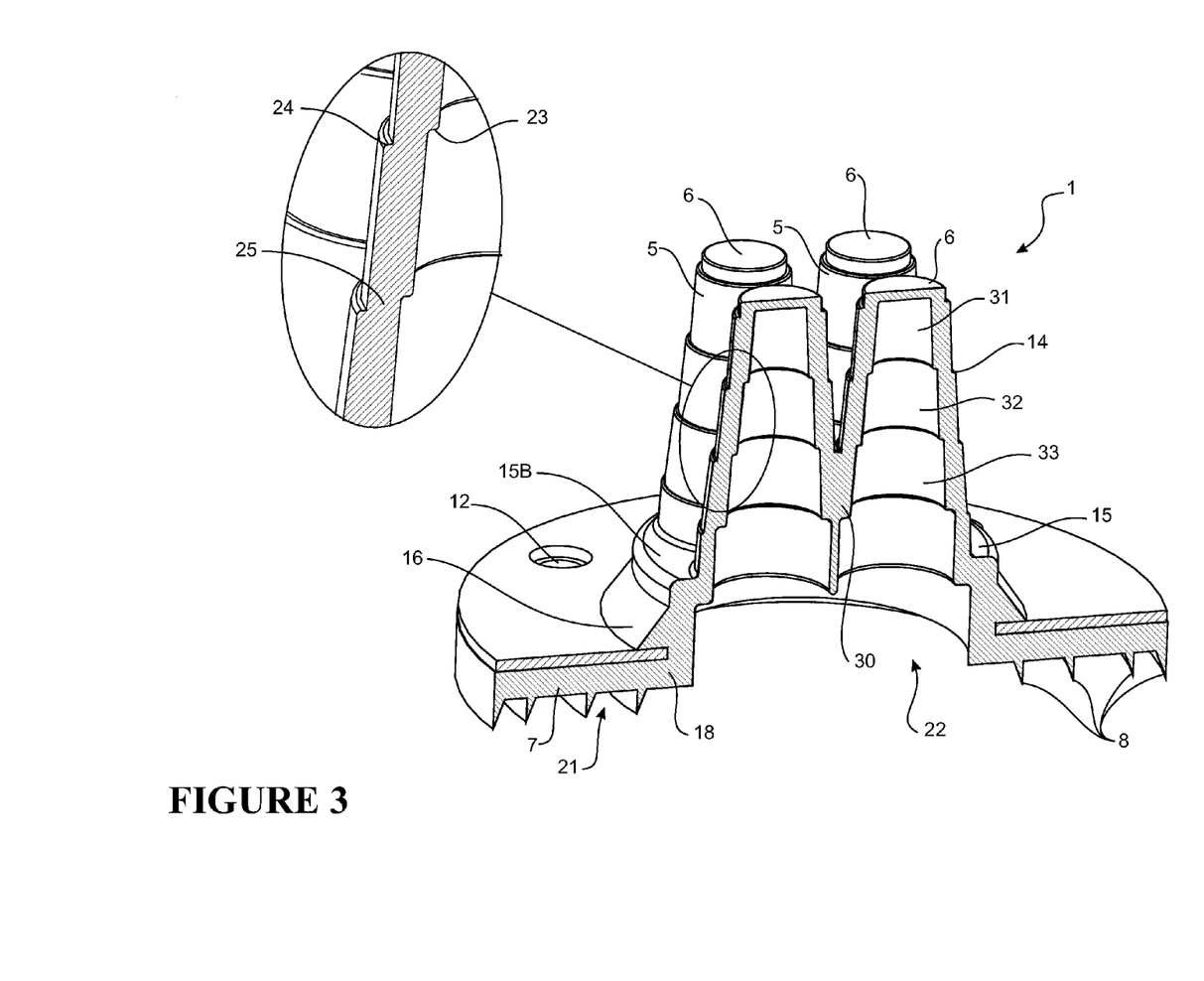
FIG. 3 is a sectional view of the sealing gland of FIG. 1 taken on line F3-F3 in FIG. 1.

As illustrated, in some embodiments, one or more skirts is provided with a stepped profile to comprise a plurality of diameters or dimensions each suitable for a different size or range of sizes of an elongate member. Each step 14 preferably allows a user to determine where to cut the skirt to create an aperture suitable for a particular size of elongate member. In the illustrated embodiments, each skirt comprises three steps providing three different sizes A, B and C as indicated in FIG. 3. Elongate members smaller than diameter A may be sealed by being pushed or pierced through the closed end 6 of the skirt. The closed end and/or at least a portion of an inner surface of the skirt contact the elongate member to form a seal against the elongate member. In other embodiments, more than 3 steps may be provided, to provide more than 3 different sealing sizes.

Figure 2:
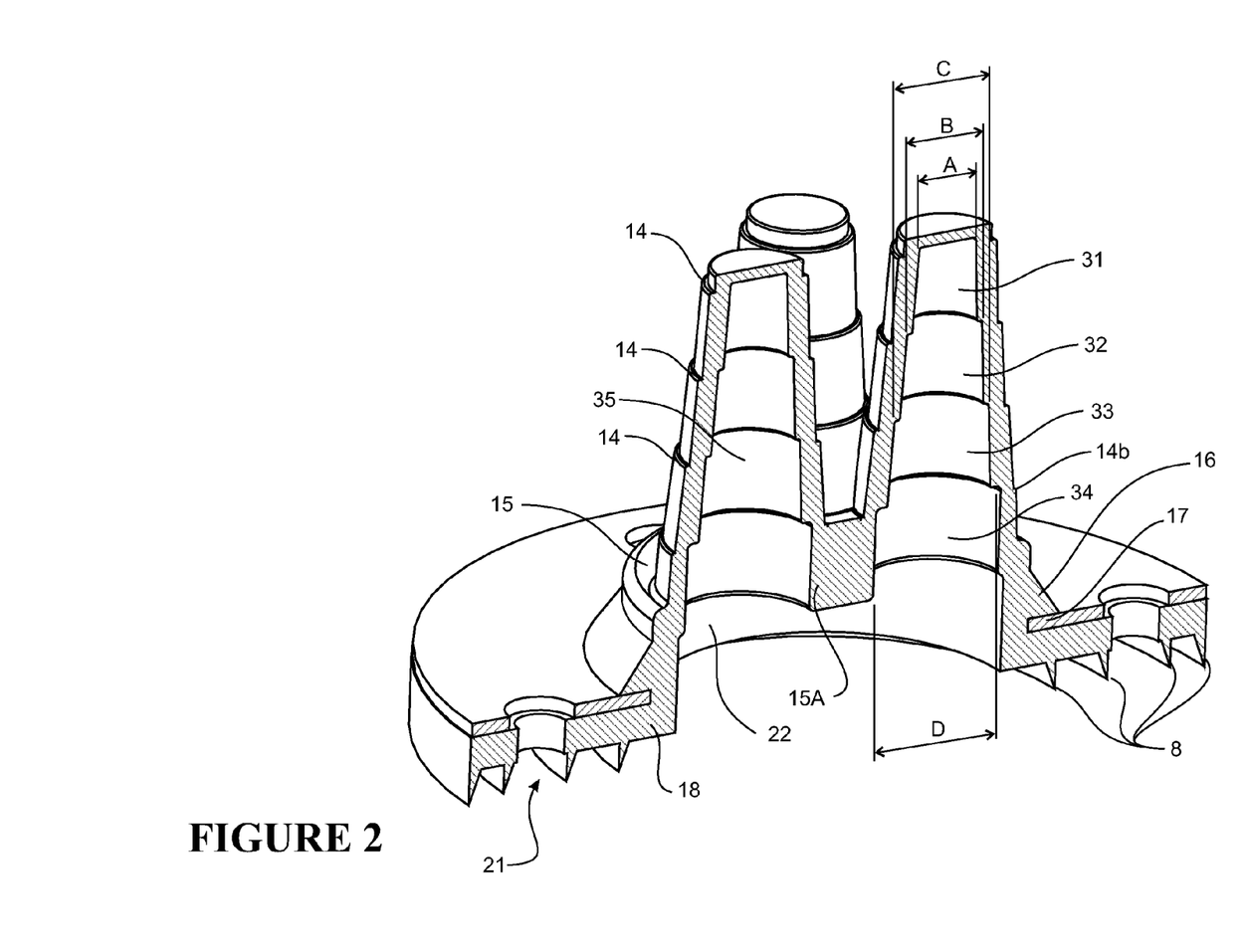
FIG. 2 is a sectional view of the sealing gland of FIG. 1 taken on line F2-F2 in FIG. 1.

In some embodiments, as illustrated in FIGS. 2 and 3, each skirt comprises a stepped external surface and a stepped internal surface. In such an embodiment, preferably the internal steps 23 are closer to the closed end 6 (the distal end) of the skirt than the external steps 24 (shown in an enlarged partial view in FIG. 3). Where the internal steps are closer to the closed end 6 of the skirt, cutting the skirt at the external step 24 ensures the corresponding internal step 23 is removed to leave a smooth internal surface of the skirt at the opening 20, for sealing around the outside of the elongate member. This arrangement provides a seal length that extends from the aperture to the next internal step to ensure a robust seal against the elongate member. The internal surface of the skirt between each internal step provides a sealing surface. For example, as indicated in FIGS. 2 and 3, the illustrated embodiment, each skirt comprises three sealing surfaces or lengths or portions 31, 32 and 33 corresponding with a minimum diameter for each seal length or portion of A, B and C respectively. More or less steps may be provided. Further, one or more skirts may comprise a different number of steps to other skirts. Where the internal steps are at the same position as the external steps or are closer to the closed end than the external steps, cutting the skirt at the external step provides a stepped internal surface near to the aperture 20 and can result in a shortened seal length or small amount of contact between the elongate member and the skirt. As shown in the enlarged partial view in FIG. 3, where the internal steps 23 are closer to the closed or distal end 6 than the external steps, the wall thickness of the skirt is thinner in a portion between an external step and an internal step. The thinner section 25 of the wall provides for a convenient cutting location identified by the external step. The thick portion of the skirt wall extending between the thin portions 25 provides a tight elastic seal around the elongate member. The thin portion 25 of the wall is more easily cut than the thick wall portions.

In some embodiments, the skirts are tapered. That is, the skirts taper from a first larger diameter to a second smaller diameter towards the closed or distal end of the skirt. In some embodiments, the skirts are both tapered and stepped. That is, the sealing surface between internal steps of the stepped internal surface is tapered, narrowing from a first (larger) diameter to a second (smaller) diameter.

As illustrated, each of the plurality of skirts 5 extend from a common base or surface 15. Each skirt provides a separate lumen 35 extending from the closed end 6 of the skirt to the base 15.

In some embodiments, the outer surfaces of adjacent skirts in the plurality of skirts are adjoined along a portion of the length of the skirts. FIG. 3 is a cross section extending through a longitudinal central plane of two adjacent skirts 5. As shown in FIG. 2, the outer surfaces of the adjacent skirts are adjoined along approximately half the length of the skirts, from the base to approximately midway along the length of the skirts. The lumen of each skirt extends from the closed end of each skirt to the base of the skirts. Therefore, the adjacent skirts share a common wall for a portion of their length extending from the base. In other words, the adjacent skirts are spaced apart so that the external surfaces of the skirts are joined along a portion of the length of the skirts while the lumens of the adjacent skirts remain separate. In the illustrated embodiment comprising four skirts, each skirt is adjoined to two adjacent skirts. In some embodiments, the skirts are adjoined from the base to a step in the wall of the skirt.

As described above, each skirt is cut at a particular position along its length to provide a suitably sized aperture or portion of the skirt to seal about an elongate member. Where adjacent skirts are adjoined along a portion of the length of the skirts, the skirt cannot be cut laterally through the adjoined walls of the adjacent skirts without exposing the lumen from both of the adjoined skirts. However, the diameter of the skirts at the extent of the adjoined portion of the walls may be sized to be a maximum predetermined diameter for the opening 20 of the skirt. The portion of the length of the skirt adjoined to an adjacent skirt therefore provides a preset or predetermined seal length or sealing portion (e.g. portion 33) for the maximum seal size of the skirt.

In use, a user may cut the skirts at a position along the length of the adjoined portion of the walls of the skirts, to open all of the skirts. For example, with reference to FIG. 2, a user may cut the skirts at the step 14B located in the portion of the length of the skirts that is adjoined with adjacent skirts. In the illustrated example, this would provide a gland comprising four sealing surfaces 34 each having a seal diameter D for sealing about four elongate members. In the illustrated example each skirt thus comprises four sealing surfaces 31, 32, 33 and 34 providing four seal diameters A, B, C and D.

In the illustrated embodiment, the wall of each skirt comprises one step 14B formed in the portion of the length of the skirt adjoined with an adjacent skirt. In some embodiments there may be more than one step 14B formed in the portion of the length of the skirt adjoined with an adjacent skirt. In the illustrated embodiment, each skirt comprises two steps 14 in the wall between the distal end 6 of the skirt and the portion of the length of the skirt adjoined to an adjacent skirt. In some embodiments, there may be one or two or three or more steps in the wall between the distal end 6 of the skirt and the portion of the length of the skirt adjoined to an adjacent skirt. In the illustrated embodiment a step is provided in the wall of the skirts at the extent of the adjoined walls of two adjacent skirts. In other words, the walls of adjacent skirts are adjoined along a portion of the length of the skirts extending from the base to a step 14 in the wall of the skirt.

In some embodiments, different diameter skirts may be provided, to provide different diameter sealing surfaces 34. In the illustrated embodiment there is one step provided in the adjoined portion of the wall. In some embodiments, there are provided more than one step in the adjoined portion of the wall.

Adjoining adjacent skirts provides a number of benefits. Adjoining the external surfaces of adjacent skirts provides a compact foot print for a sealing gland for sealing a plurality of elongate members. Adjoining the external surfaces of adjacent skirts provides a compact foot print for a sealing gland for sealing a plurality of elongate members, where the lumen of each skirt extends the full length of the skirt from the closed end 6 of the skirt to the base from which the plurality of skirts extends. The adjoined walls of adjacent skirts provide additional structural support to each skirt. Such support may reduce mechanical stress at the root of each skirt where each skirt connects to the base. Where elongate members such as cables or pipes have a relatively small diameter, such elongate members can be relatively flexible at least compared to thicker elongate members with larger diameters. The portion of the skirts not adjoined to adjacent skirts provides sufficient flexibility to maintain a seal around smaller diameter elongate members. However, the adjoined skirts provide more rigid support for larger diameter elongate members, and may help to reduce tearing of the sealing gland when sealing around larger diameter elongate members. The full length of the lumen of each skirt extending from the end of the skirt to the base of the sealing gland assists with the insertion of multiple elongate members through the gland. The full length of the lumen of each skirt extending from the end of the skirt to the base of the sealing gland assists with separating the elongate members when inserting them through the gland.

In use, a user may cut the skirts at different heights or positions along the length of the skirts to seal about a number of differently sized elongate members. In some embodiments, the sealing gland may comprise different length skirts, and/or different diameter skirts. One or more skirts may have a different number of steps to the other skirts.

Each skirt extends from the base, a root of each skirt being connected to the base. Preferably the base comprises a thickness that is greater than the side wall thickness of the skirts. The thinner section of the side wall of the skirts provides sufficient flexibility to conform to and seal about the elongate members. The thicker section of the base provides sufficient rigidity to support the skirts in their relative positions. By comparison between FIGS. 2 and 3, it is shown that in some embodiments, the portion 15A of the base that is encircled by or surrounded by or enclosed by the adjoined skirts 5 comprises a greater thickness than the thickness of the portion 15B of the base that is outside of the adjoined skirts 5. The thicker central part 15A of the base provides additional structural support to prevent the base from distorting and the skirts being spread outwards from their undeformed relative positions. In some embodiments the thickness of the base encircled by the skirts is at least twice the thickness of the base outside the skirts. In some embodiments the thickness of the base encircled by the skirts is two to three times the thickness of the base outside the skirts.

The sealing gland comprises a main sealing portion for sealing with or against a surface or about a pipe from which the elongate members extend. In some embodiments the main sealing portion comprises a flange 7 for sealing against a surface. The flange 7 extends radially outwards from the base 15. The flange 7 has a sealing side 21. In some embodiments, a number of lip seals 8 are located on the sealing side 21 of the flange. The illustrated embodiment comprises four lip seals. However, some embodiments may comprise one, two, three, four, or more lip seals. The lip seals 8 are of sufficiently thin cross section so that with the application of a small amount of pressure they are able to deform and seal against a wall or surface to which the gland is sealing. By having a number of concentric lip seals 8 a number of sealing points on a surface or object are formed to further ensure the integrity of such a seal being formed.

The flange 7 also has a plurality of flange apertures 12 formed there through. In use, these receive fasteners. In the preferred embodiment these flange apertures 12 are each of a lesser diameter than the fasteners which they are to receive. This is to further ensure the integrity of the seal formed, as the preferred material from which the flange 7 is manufactured is a deformable, elastic, and resilient material which is also chemically inert, such as silicone based compounds, or similar. The flange apertures 12 will therefore stretch to fit around the fasteners and thereafter seal against them. In some embodiments the flange apertures are closed, so that the closed apertures (blind holes) are required to be pierced by a fastener when installing the gland. Preferably the apertures 12 are positioned in between two lip seals 8 so that the apertures and fasteners once installed do not interrupt the lip seals.

In some embodiments, a retention flange or lip 16 is provided. The retention lip is spaced from the flange 7, so that a gap or annular slot or recess 17 is provided between the retention lip 16 and the flange 7. The annular slot 17 is of a similar thickness to a compression ring 9, as described below. The retention lip 16 is intended to retain the compression ring 9 in place at the flange 7.

The compression ring 9 is a ring which in use slips over the skirts 5 and base 15, and is located so that the ring 9 rests against the flange 7, with a radially inward edge or portion of the compression ring 9 received in the annular groove 17. The retention lip 16 bears upon the radially inner portion of the ring to hold the ring in place. The radially inner annular portion of the compression ring is sandwiched between the retention lip 16 and the flange 7 to retain the compression ring 9 to the sealing gland 1 against the flange 7. The radially inner annular portion of the compression ring is sandwiched between the retention lip 16 and the flange 7 so that a seal is formed between the retaining lip 16 and the facing surface of the compression ring 9, and a seal is also formed between the flange 7 and the compression ring 9. Other arrangements for retention of the ring 9 may be employed.

The compression ring 9 is made of a sufficiently rigid material such that when the sealing gland 1 is applied and fasteners are used, the compression created by the fasteners is able to be resisted by the stiffness of the compression ring so that an even or substantially even pressure is applied to the flange 7 by the compression ring 9. If a higher degree of seal is required then a stiffer compression ring 9 may be used so that more force may be exerted onto the flange 7 and therefore the lip seals 8.

In a preferred embodiment comprising the compression ring, the compression ring 9 has a first plurality of apertures 11 spaced at intervals around its body, which allow fasteners to pass there through. The apertures 11 are in the preferred embodiment concentric and able to be located with the plurality of apertures 12 in the flange 7.

In applying the sealing gland to an elongate member and substantially flat surface to be sealed the following steps are undertaken. The correct opening 20 diameter to form the seal about the elongate member is selected and/or cut in one of the plurality of skirts. Where multiple elongate members are required to pass through the surface and be sealed by the gland, then a corresponding number of skirts are selected and each cut to a suitable size. The sealing gland is thereafter slid down or along the elongate member or members (for example a pipe or similar conduit or cable or combination of pipes and cables) until the lip seals 8 meet the substantially flat surface. The substantially flat surface is only an example and any form of sealing surface may be appropriate and in some embodiments the compression ring 9 and/or flange 7 may be formed to conform to various surfaces that may not be flat, for example corrugated, curved or similar. There may additionally be some form of reinforcing internal of the flange 7 which allows confirmation of the flange 7 to the required surface. This reinforcing or conformable, yet shape retaining material, may be in exclusion or in addition to the compression ring 9. Each skirt deforms and shapes itself around a corresponding elongate member by the elastic tension of the skirt 5 to form a seal. The opening 20 in the skirt is therefore generally cut to a slightly smaller diameter or size than that of the elongate member to which it is to seal to.

In some uses the gland may be assembled to the elongate member or members separate to the compression ring 9. For example the compression ring 9 may be fitted to the gap between the retention lip and the flange 7 after the gland is located against a substantially flat surface.

In the preferred embodiment, the skirts have a circular cross section so that the corresponding opening 20 is also circular to seal about circular or substantially circular tubes, pipes and cables. However, if a pyramidal shaped skirt is used, the shape of the aperture 20 created may also be rectangular, triangular, a regular or irregular polygon or any other shape that is necessary to be sealed to.

Correspondingly the pending skirt 5 and flange 7 may be of a corresponding shape to that of the opening or may form a transition from the shape of the opening to for example a substantially circular flange 7.

Once the sealing gland 1 is in place on the elongate member and the surface, fasteners are passed through the apertures 11, 12 on the compression ring 9 and the flange 7 respectively. These fasteners then pass through and engage either into corresponding nuts or corresponding fastening means in the surface or on an opposite side of the surface. Thereafter the fasteners are tightened such that the lip seals 8 deform against the surface to form a seal.

Additionally if higher compression pressures are required to form the seal, further plurality of apertures may be added to both the compression ring 9 and flange 7 so that further force can be exerted without deformation or substantial deformation of the compression ring 9 by use of further fasteners.

The same materials that are used to form the skirts of the sealing gland 1 may also be used to form the lip seals 8. In the preferred embodiment the lip seals 8, flange 7, the base 15 and the skirts 5 are of unitary, or one piece construction. Such unitary construction is preferably made by moulding or similar in the resilient material, for example silicone as mentioned. The sealing gland 1 therefore in some embodiments is a two piece construction being the silicone moulded component and metallic component of the compression ring 9. The compression ring 9 is preferably manufactured from a stainless steel and in conjunction with the inert nature of the silicone provides a chemically resistant seal between the elongate member or members and a surface.

Figure 1:
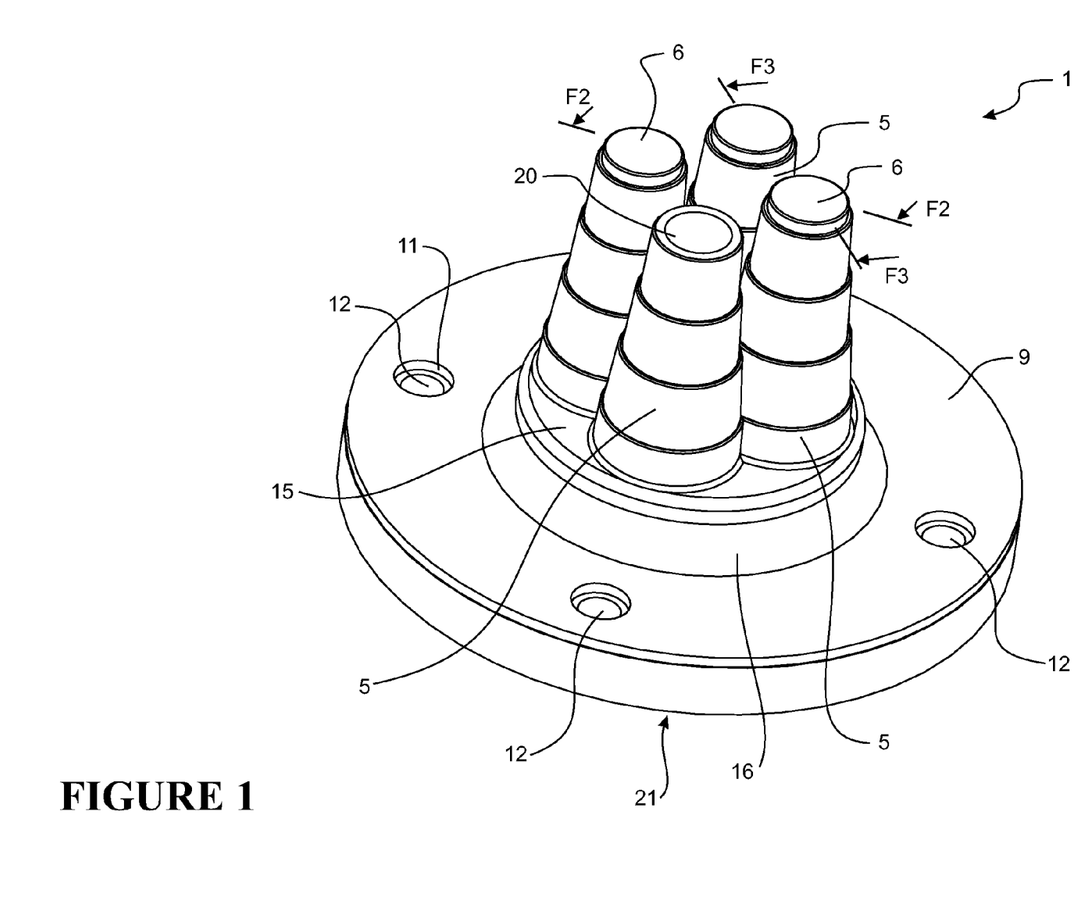
FIG. 1 is a perspective view of a sealing glad according to one embodiment of the present invention for sealing between elongate members and a planar surface.

The above-described embodiment illustrated in FIGS. 1 to 3 is useful for creating a seal between a surface and an elongate member or members. In some situations it may be desirable to create a seal about one or more elongate members and an end of a pipe from which the elongate members extend. For example, with reference to FIG. 4, the pipe 106 may be a conduit that provides protection around the elongate members 102 such as a plurality of pipes or cables.

Figure 4:
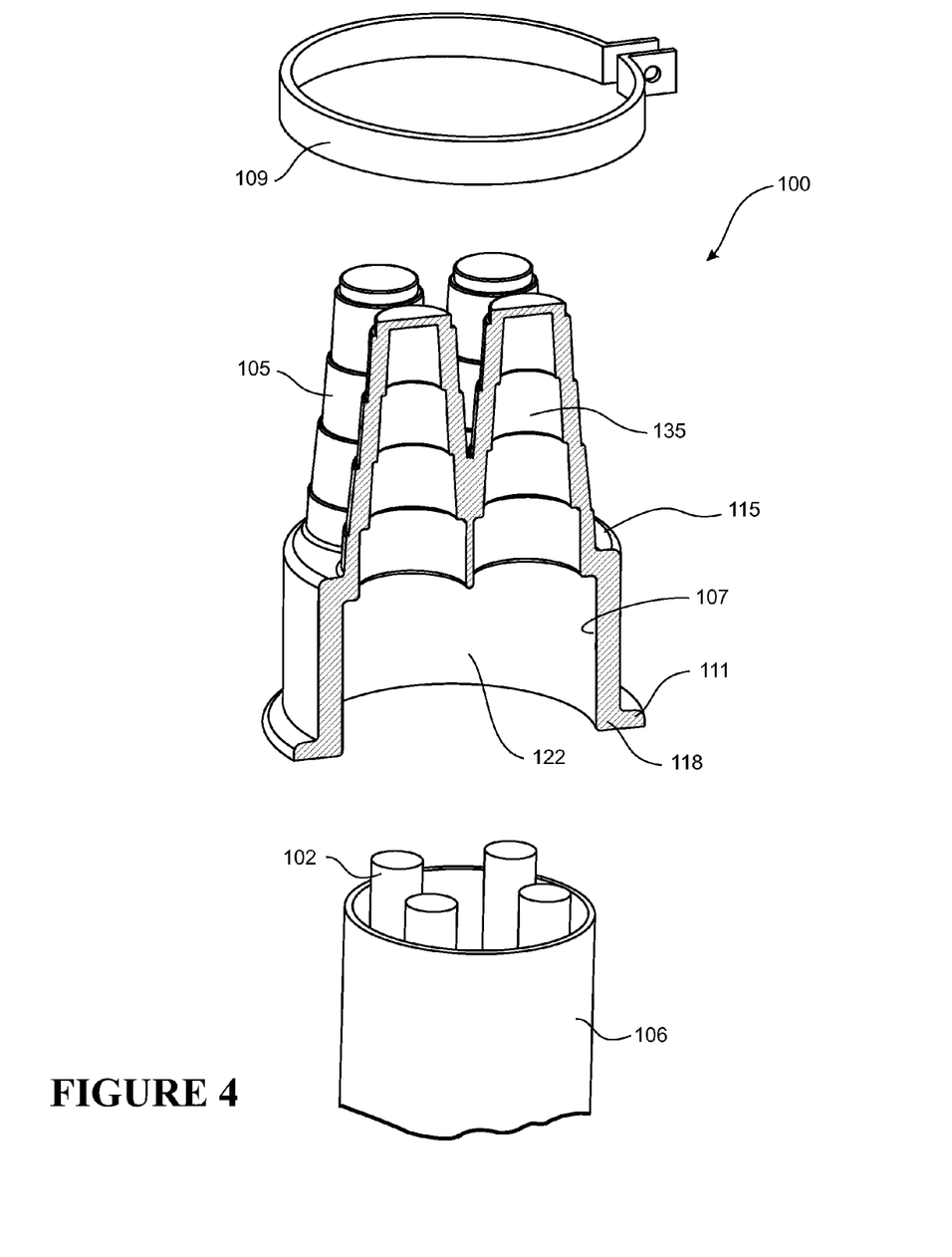
FIG. 4 is a sectional view of a sealing gland according to another embodiment of the present invention for sealing between elongate members and an end of a pipe or conduit containing the elongate members.

A second, alternative embodiment of the invention that can be used to provide this type of seal is described with reference to FIG. 4.

A sealing gland 100 is shown, in a similar fashion to the sealing gland of the first embodiment described above, this has a plurality of skirts 105 as described with reference to the first embodiment 1. The main sealing portion of the gland for sealing with the pipe 106 extends from the base 115 of the gland from which the skirts 105 extend. In the preferred embodiment, the main sealing portion of the gland for sealing to the pipe comprises a cylinder, with an open end 118 for receiving the pipe 106. However in other embodiments this cylindrical or tubular section may be a square tube or other multisided poly in cross section, whether regular or not.

As in the preferred embodiment described above, the sealing gland 100 is made from a silicone material, or similar.

In use, one or more skirts 105 are cut to create an aperture, in a similar fashion to that already described for the first embodiment. Again, different skirts may be cut at different heights or positions along their length to accommodate different sized elongate members. An elongate member can be passed into the skirt of the sealing gland, with the perimeter of the skirt deforming around the outer surface of the elongate member to form a seal. The open end 118 of the sealing gland is then fitted over the end of the pipe 106, with the open end of the sealing gland deforming around the outer surface of the pipe 106 to form a seal.

If required, an inner surface 107 of the open end of the gland can be fitted with one or more lip seals running around the internal surface of the open end of the gland. These lip seals aid in sealing between the open end of the gland and the pipe.

In one preferred embodiment a tensile band 109 is used around the open end of the gland. The band can help improve the seal around the pipe. The open end of the gland may comprise a thickened band 111. This thickened band serves a number of purposes. Firstly it reinforces the open end of the gland and stops tearing, particularly when tools may be used to apply the sealing gland over the pipe. Secondly, the thickened band can provide a shoulder to push against to push the gland over the end of the pipe 106. Also, the thickened band 111 may serve as a reference, to locate the tensile band 109 and prevent it working or falling off.

In some installations a compact seal for sealing the gland to a surface may be required. For example, an electrical box or other enclosure may not provide sufficient surface area on a wall of the box or enclosure to accommodate a flange 7 as described with reference to the first embodiment of FIGS. 1 to 3.

Figure 5:
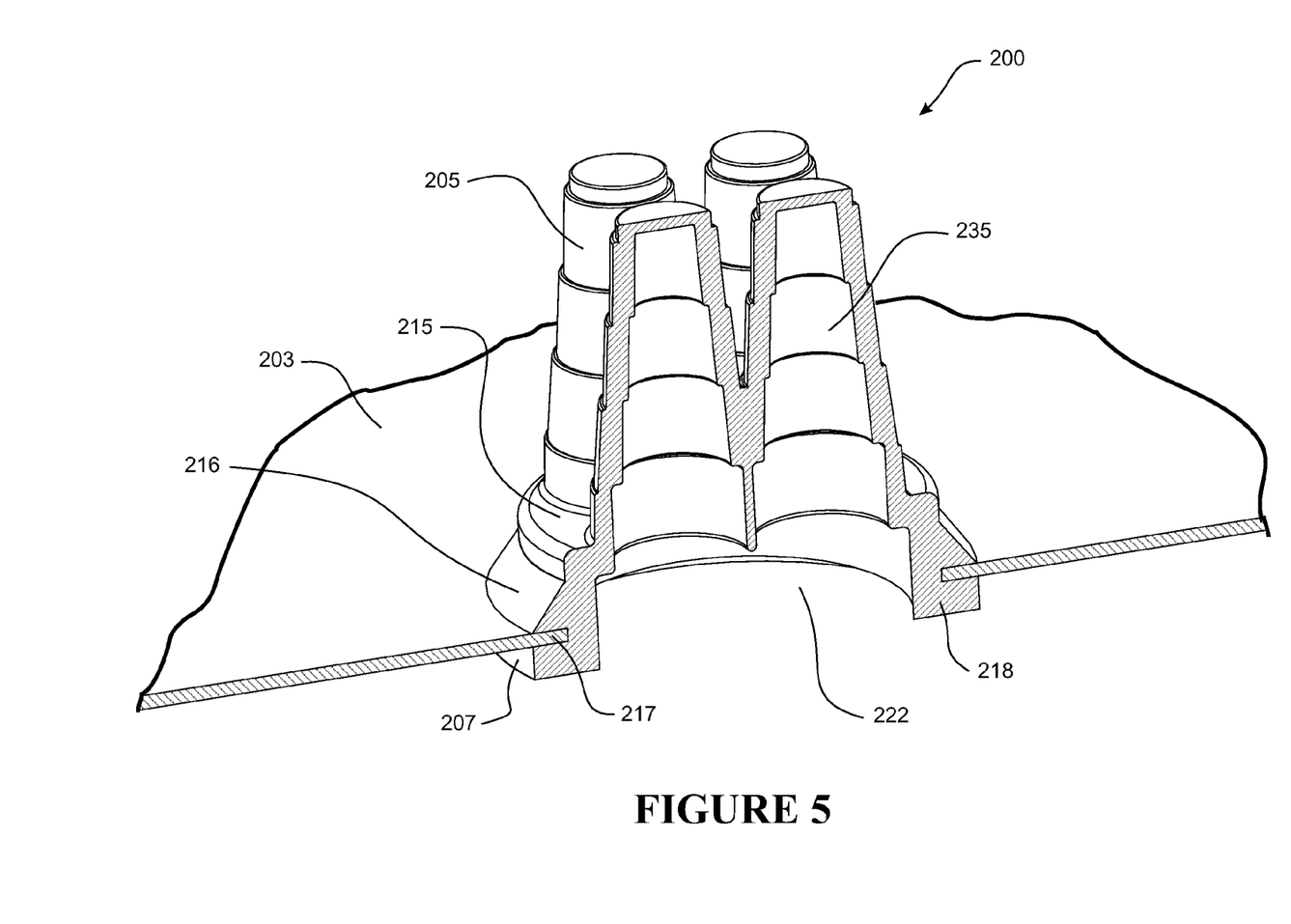
FIG. 5 is a sectional view of a sealing gland according to another embodiment of the present invention for sealing between elongate members and a planar surface.

A third embodiment 200 is described with reference to FIG. 5. In the third embodiment, the sealing gland comprises an annular groove or seat 217 extending about an outer circumference of the gland 200. The groove 217 is formed in an outer surface of the gland. The grove is formed between a retaining lip 216 and a corresponding shoulder 207. The lip, shoulder and groove form the main sealing portion of the gland for sealing a hole in a wall or other surface 203.

In use, a hole is provided or cut in the surface through which one or more elongate members are to extend through. The hole is cut to a predetermined diameter or size to match the particular gland to be used. Alternatively a gland of the correct sealing diameter is provided to match a hole in a wall or other surface to be sealed. In use, the gland is fitted to a hole in a wall or other surface by elastically deforming the gland to pass the open end 218 of the gland into the hole so that the perimeter of the hole of the wall 203 fits into the annular groove 217. The perimeter of the hole in the surface to be sealed fits into the annular groove in much the same way as the inner perimeter of the compression ring fits into the groove or gap provided between the retention lip 16 and the flange 7 of embodiment 1. The wall 203 is held or retained between the lip 216 and the shoulder 207 so that the gland forms a seal with the wall. An annular portion of the wall forming a perimeter of the hole or aperture in the wall is sandwiched between the retention lip 216 and the shoulder 207 so that a seal is formed between the retaining lip 216 and the facing surface of the wall 203, and a seal is also formed between the shoulder 207 and an opposite surface of the wall 203. The retention lip 216 overlaps and bears on an annular portion of the wall forming a perimeter of the hole to form a seal with the surface of the wall. The shoulder 207 overlaps and bears on the annular portion of the wall to form a seal with the opposite surface of the wall. An edge of the aperture through the wall may also bear on an inner surface of the groove so that the seal length between the gland and the wall extends from the outer extent of the retention lip, through the groove to the outer extent of the shoulder.

Once the sealing gland is fitted to the hole in the wall or other surface, one or more elongate members may be extended through the hole in the surface and pushed through the skirts 205 (for example after one or more skirts are cut to the required diameter as described earlier) via the open end of the gland fitted to and sealing the surface. Alternatively, with the elongate members extending through the hole in the surface, the sealing gland may be slid down or along the elongate member or members until the gland is positioned at the hole in the surface to be sealed. The gland is then fitted to the hole in the surface to seal around the hole. However, this latter fitment method may be less preferred as fitting the gland to the hole in the surface may be more difficult with the elongate members already received in the skirts. A range of glands may be provided, each gland with a different sized open end and/or different thickness and/or different depth groove 217 to suit different sized holes and/or different wall thicknesses.

In the embodiments of FIGS. 1 to 5, the sealing gland comprises an internal cavity 22, 122, 222 between the lumens 35, 135, 235 of the skirts 5, 105, 205 and the open end of the gland 1, 100, 200. The cavity is provided between the base 15, 115, 215 from which the skirts extend and the open end 18, 118, 218 of the gland. The base 15, 115, 215 is spaced from the open end of the gland to provide the cavity. The lumen 35, 135, 235 of each skirt extends from and is in communication with the cavity 22, 122, 222.

Figure 6:
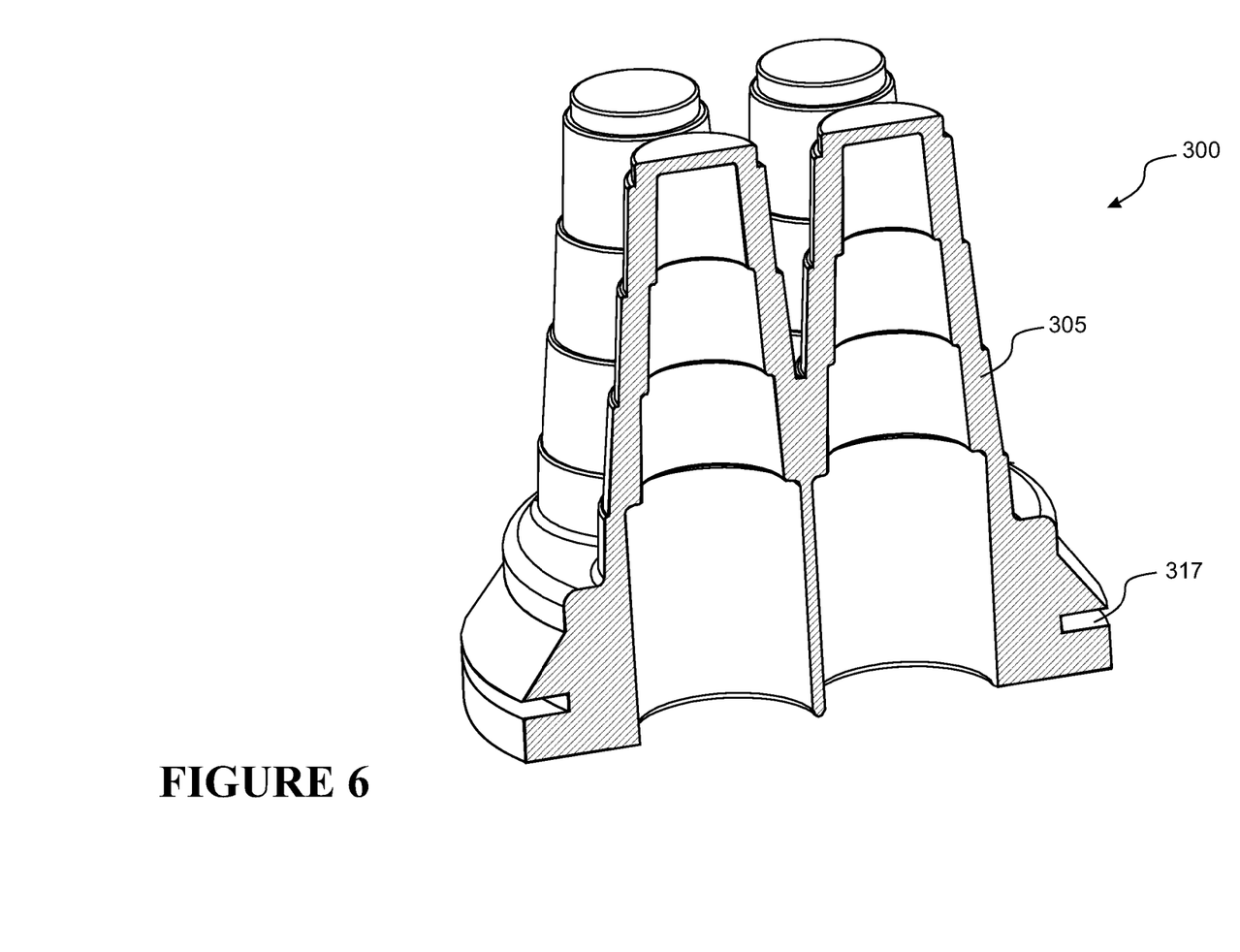
FIG. 6 is a sectional view of a sealing gland according to another embodiment of the present invention similar to the embodiment of FIG. 5 for sealing between elongate members and a planar surface.
Figure 7:
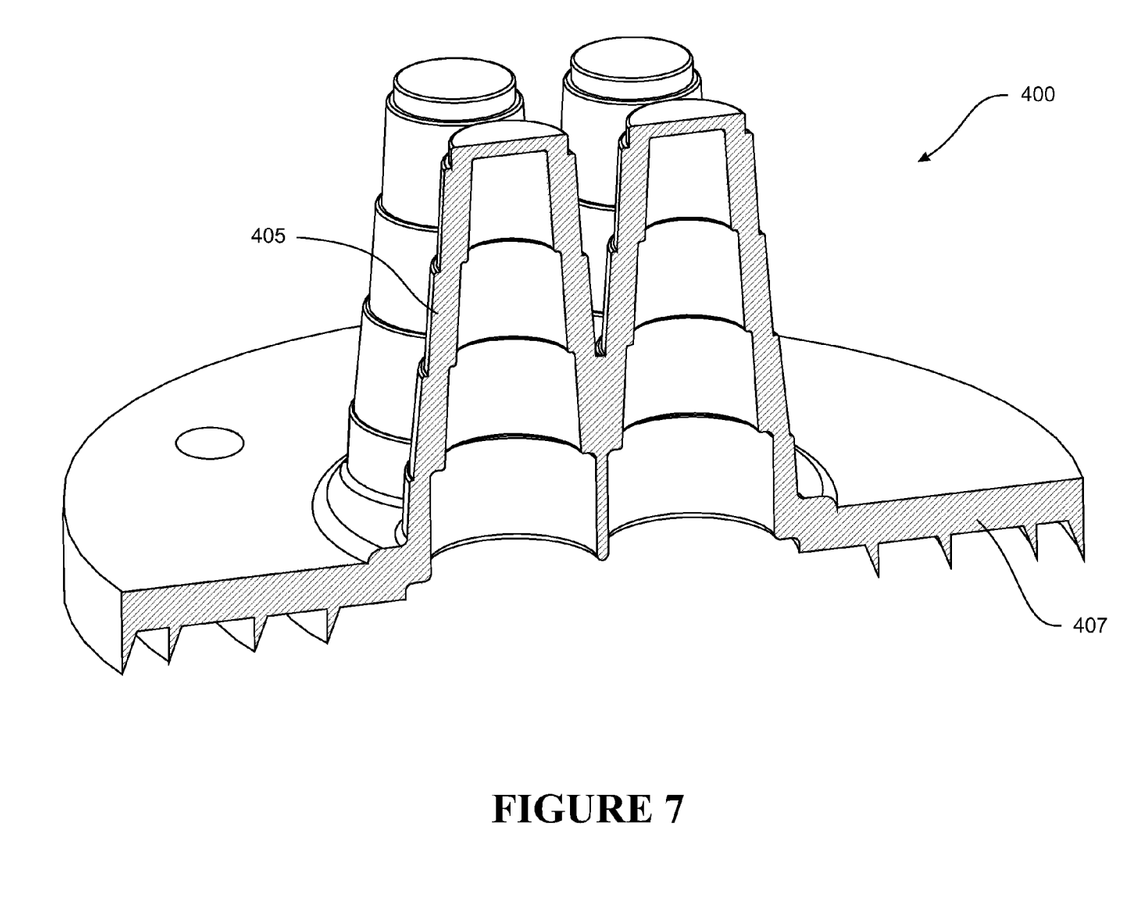
FIG. 7 is a sectional view of a sealing gland according to another embodiment of the present invention similar to the embodiment of FIG. 1 for sealing between elongate members and a planar surface.

In some embodiments, for example as illustrated in FIGS. 6 and 7, the lumens of the skirts extend the full length of the sealing gland. That is, the sealing glands 300, 400 of FIGS. 6 and 7 are provided without a cavity between the end of the lumens of the skirts 305, 405 and the open end of the gland. The embodiment of FIG. 6 is similar to the embodiment of FIG. 5 but is without the cavity 222 of the embodiment of FIG. 5. The embodiment of FIG. 6 may be less preferred to the embodiment of FIG. 5 as the cavity may provide additional flexibility useful for fitting the sealing groove 317 to the edge of a hole in a surface to be sealed.

In FIG. 7, the flange 407 providing the main sealing portion of the gland also forms a base from which the skirts 405 extend. The embodiment of FIG. 7 may be less preferred to the embodiment of FIGS. 1 to 3 as the embodiment of FIG. 7 is without a retention lip for retaining a compression ring (item 109 in embodiment 1) to the flange.

A sealing gland according to the present invention provides a compact and robust gland adapted to seal between a pipe or surface and a plurality of elongate members. Further, a gland according to the present invention may be used to seal a number of elongate members less than the number of skirts. For example, a gland according to the present invention comprising a plurality of skirts may be used to seal between a surface and a single elongate member. Unused skirts remain sealed or closed. Thus a sealing gland according to the present invention provides flexibility in that additional cables or pipes or other elongate members may be added to extend through a wall or surface via the gland at a later time without adding additional holes in the surface.

The foregoing description of the invention includes preferred forms thereof. Modifications may be made thereto without departing from the scope of the invention as defined by the accompanying claims.

The invention claimed is:
1. A sealing gland for forming a seal between a plurality of elongate members and a surface having an aperture, or a pipe, through which said elongate members extend, said sealing gland comprising:

a main sealing portion for sealing to the surface or the pipe, a plurality of skirts extending from a base of the sealing gland, each skirt comprising a lumen extending from the base to a distal end of the skirt for receiving a said elongate member, each skirt providing a flexible seal for sealing around a periphery of a said elongate member, and adjacent skirts in the plurality of skirts adjoined along a portion of the length of the skirts;

the skirts comprising a stepped external surface and a stepped internal surface, internal steps of the stepped internal surface positioned closer to a distal end of the skirt than external steps of the external surface.

2. A sealing gland as claimed in claim 1, wherein the adjacent skirts are adjoined along approximately half the length of the skirts, from the base to approximately midway along the length of the skirts.

3. A sealing gland as claimed in claim 1, wherein at least one said skirt comprises a closed end, the skirt comprising the closed end adapted to be cut to provide an aperture for a said elongate member to extend through.

4. A sealing gland as claimed in claim 1, where each said skirt comprises a closed end.

5. A sealing gland as claimed in claim 1, wherein the internal surface of the skirt between each internal step provides a sealing surface for sealing about a said elongate member.

6. A sealing gland as claimed in claim 5, wherein each said sealing surface is tapered narrowing from a first diameter to a second diameter towards a distal end of the skirt.

7. A sealing gland as claimed in claim 1, wherein the wall of each skirt comprises at least one step formed in the portion of the length of the skirt adjoined with an adjacent skirt.

8. A sealing gland as claimed in claim 1, wherein each skirt comprises at least one step in the wall between the distal end of the skirt and the portion of the length of the skirt adjoined to an adjacent skirt.

9. A sealing gland as claimed in claim 1, wherein adjacent skirts in the plurality of skirts are adjoined along a portion of the length of the skirts extending from the base to a step in the external surface of the wall of the skirt.

10. A sealing gland as claimed in claim 1, wherein an internal diameter of a said skirt at an extent of a join between the walls of two adjacent adjoined said skirts is a maximum aperture size of that skirt.

11. A sealing gland as claimed in claim 10, wherein an internal surface of the skirt extending from the maximum aperture towards the base is a sealing surface for sealing about a said elongate member.

12. A sealing gland as claimed in claim 1, wherein each skirt is adjoined to two adjacent skirts.

13. A sealing gland as claimed in claim 1, wherein the base comprises a thickness greater than a thickness of the wall of the skirt.

14. A sealing gland as claimed in claim 13, wherein the thickness of a portion of the base that is encircled by the skirts is greater than the thickness of a portion of the base outside the plurality of skirts.

15. A sealing gland as claimed in claim 14, wherein the thickness of a portion of the base that is encircled by the skirts is at least twice the thickness of a portion of the base outside the plurality of skirts.

16. A sealing gland as claimed in claim 1, wherein the sealing gland comprises four skirts.

17. A sealing gland as claimed in claim 1, wherein the main sealing portion of the sealing gland comprises a flange for sealing to the surface, the flange projecting radially outwards from an open end of the sealing gland.

18. A sealing gland as claimed in claim 17, wherein the sealing gland comprises a retaining lip for retaining a compression ring in place against the flange.

19. A sealing gland as claimed in claim 18, wherein the flange is coplanar with the base.

20. A sealing gland as claimed in claim 18, wherein the flange is provided at an open end of the sealing gland spaced from the base in a longitudinal direction, the sealing gland comprising an internal cavity between the base and the flange.

21. A sealing gland as claimed in claim 1, wherein the main sealing portion of the gland comprises a tubular section extending from the base for sealing to an end of a pipe from which the elongate members extend.

22. A sealing gland as claimed in claim 1, wherein the main sealing portion of the sealing gland comprises an annular groove formed between a retaining lip and an annular shoulder, the annular groove for receiving a perimeter of the aperture in the surface of a wall, in use the groove retaining the wall between the retaining lip and the shoulder to form a seal with the surface.

23. A sealing gland as claimed in claim 1, wherein the sealing gland comprises an internal cavity between the base and an open end of the sealing gland, the lumen of each skirt extending from a distal end of each skirt and the internal cavity.

24. A sealing gland as claimed in claim 1, wherein the lumen of each skirt extends the full length of the sealing gland from the distal end of the skirt to an open end of the sealing gland.

25. A sealing gland as claimed in claim 1, wherein the sealing gland is a unitary member.

* * * * *